United States Patent [19]

Horng

[11] Patent Number: 5,564,686

[45] Date of Patent: Oct. 15, 1996

[54] AUTOMATIC DOCUMENT FEEDER FOR AN IMAGE FORMING APPARATUS

[75] Inventor: Min-Ching Horng, Taoyuan, Taiwan

[73] Assignee: Acer Peripherals, Inc., Taoyuan, Taiwan

[21] Appl. No.: 510,042

[22] Filed: Aug. 1, 1995

[51] Int. Cl.⁶ ............................. B65H 5/02; G03G 15/00
[52] U.S. Cl. ........................... 271/4.01; 271/301; 355/75; 355/308
[58] Field of Search ........................... 355/75, 230, 308; 271/303, 301, 4.01; 358/496

[56] References Cited

U.S. PATENT DOCUMENTS

| 4,846,456 | 7/1989 | Sakai ................................. 355/75 X |
| 4,975,749 | 12/1990 | Tsunoda et al. .................... 355/308 X |
| 5,296,908 | 3/1994 | Hatano et al. ...................... 271/303 X |

*Primary Examiner*—Joan H. Pendegrass
*Assistant Examiner*—Sophia S. Chen
*Attorney, Agent, or Firm*—Fish & Richardson P.C.

[57] ABSTRACT

An automatic document feeder (ADF) used with an image forming apparatus automatically and sequentially feeds a plurality of documents having images thereon from a paper cassette to an illumination position of the image forming apparatus with the topmost document of the plurality of documents fed first. The plurality of documents are placed and stacked in the paper cassette selectively in a sequential page order and a reversed page order. The ADF comprises a first document path, a second document path and a path selector. The first document path directs the documents to the illumination position and discharges the plurality of document after being illuminated to a first document outlet of ADF such that the discharged documents are stacked in the reversed page order when the plurality of documents are stacked in the sequential page order in the paper cassette. The second document path directs the documents to the illumination position and discharges the plurality of documents after being illuminated to a second document outlet of ADF such that the discharged documents are stacked in the sequential page order when the plurality of documents are stacked in the sequential page order in the paper cassette. The path selector selects between the first and second document paths.

1 Claim, 4 Drawing Sheets

AUTOMATIC DOCUMENT FEEDER FOR AN IMAGE FORMING APPARATUS

TECHNICAL FIELD OF INVENTION

The present invention relates to an automatic document feeder (ADF) used with an image forming apparatus and, more particularly, to an ADF which can selectively discharge the original documents in a sequential order and a reversed order.

BACKGROUND OF THE INVENTION

An ADF is extensively used with a copier or similar image forming apparatus, e.g. a scanner, for automatically and sequentially feeding a plurality of documents with image thereon to an scanning position. At the scanning position, the document is illuminated to reproduce an image thereof on a media, e.g. a sheet of paper or transparency.

In the market, there are supplied two types of ADF with respect to the document path. The first type is so-called straight-path and the other type is the U-turn path. The straight-path type serves better for the documents of different thickness. After the scanning of a plurality of documents in a sequential page order, however, the order of page of the discharged document from the outlet of the ADF will be reversed compared to the original sequential order. To the contrary, while the U-turn path type ADF discharges the documents in the same sequential page order as the original document stacked in the paper cassette of the ADF, it serves better for the document of smaller thickness. That is to say, jamming of documents of thicker sheet often happens when U-turn path type ADF is employed.

Since none of the conventional ADF is able to transfer the documents either in straight-path mode or else the U-turn mode at the discretion of the user, demand has therefore arisen for ADF capable of operating in both the above-described modes.

SUMMARY OF THE INVENTION

It is, therefore, an object of the present invention to provide an ADF for an image forming apparatus which is capable of operating in both the above-described modes.

It is anther object of the present invention to provide a generally improved ADF for an image forming apparatus.

In accordance with the present invention, an automatic document feeder (ADF) used with an image forming apparatus automatically and sequentially feeds a plurality of documents having images thereon from a paper cassette to an illumination position of the image forming apparatus with the topmost document of the plurality of documents fed first. The plurality of documents are placed and stacked in the paper cassette selectively in a sequential page order and a reversed page order. The ADF comprises a first document path, a second document path and a path selector. The first document path directs the documents to the illumination position and discharges the plurality of document after being illuminated to a first document outlet of ADF such that the discharged documents are stacked in the reversed page order when the plurality of documents are stacked in the sequential page order in the paper cassette. The second document path directs the documents to the illumination position and discharges the plurality of documents after being illuminated to a second document outlet of ADF such that the discharged documents are stacked in the sequential page order when the plurality of documents are stacked in the sequential page order in the paper cassette. The path selector selects between the first and second document paths.

DESCRIPTION OF THE PREFERRED EMBODIMENT

Figure 1:
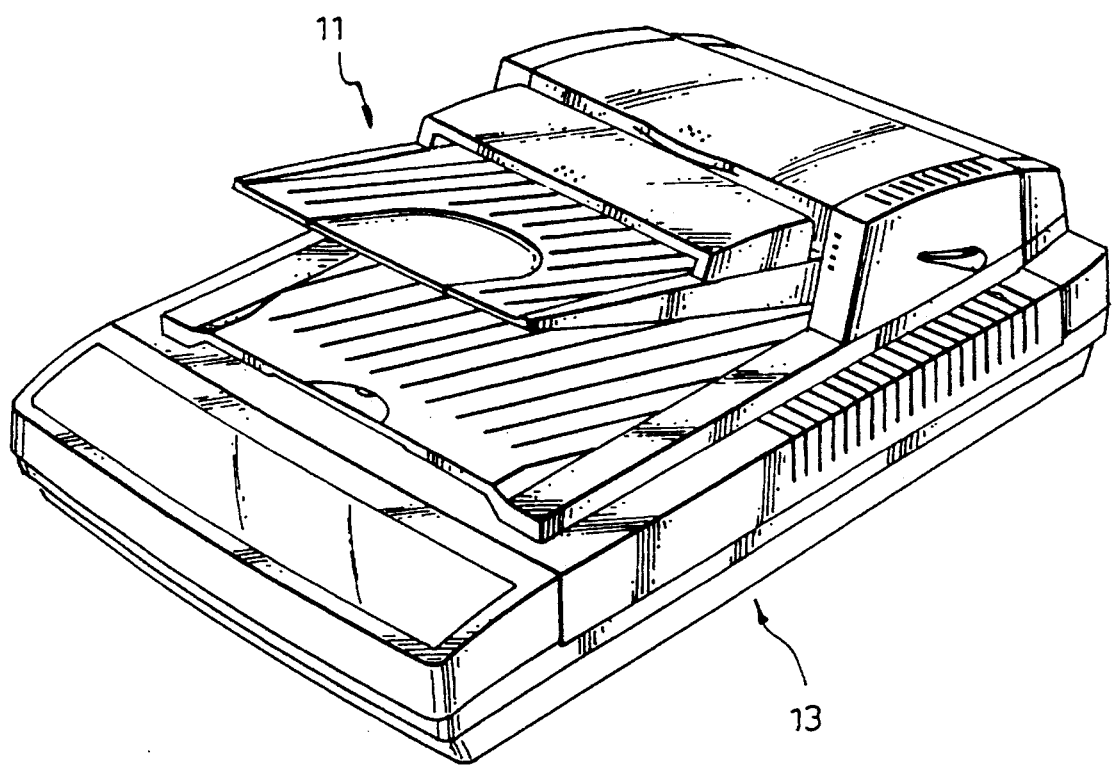
FIG. 1 displays a perspective view of an ADF used and cooperating with a flat-bed scanner.

As shown in FIG. 1, the ADF 11 of the invention is generally disposed above a platen included in a flat bed scanning apparatus 13 and openable away from the platen.

Figure 2:
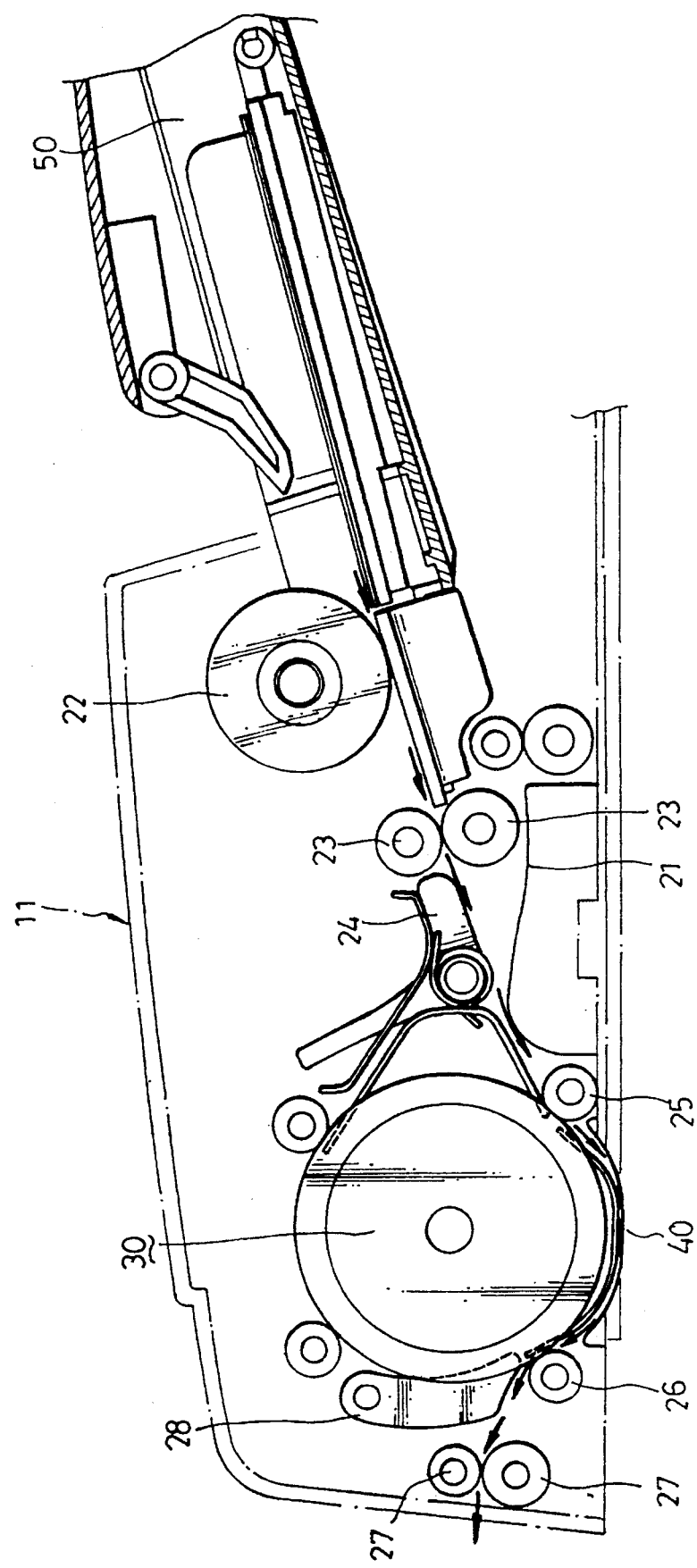
FIG. 2 is the view showing the components of the invention and the operation of straight-path mode.

Referring to FIG. 2, the present invention comprises a first document path which is defined by a pick-up roller 22, the transporting rollers 23, the transporting rollers 25, 26, 30, and discharge rollers 27. The document is directed through the first document path indicated by the arrow sign as the path selector 24 is set to guide the document transporting from the nip between the rollers 23 downwardly as shown in FIG. 2. The documents are placed and stacked first in the cassette 50 before the scanning operation. As the operation begins, the topmost sheet of documents in the stack is fed into the inner space of ADF through the nip between the pick-up roller 22 and the cooperating guiding surface. Afterwards, the document passes the nip between the transporting rollers 23 and enters into the nip between the rollers 30 and 25 through the guidance of the lower surface of the selector 24 and the guiding surface 21. After passing the scanning position 40 located below the roller 30, the document passes the nip between the rollers 30 and 26. Since the selector 28 is activated to bias by a small counterclockwise angle which closes the channel formed between the inner surface of the selector 28 and the roller 30, the document passes the nip between the discharge rollers 27 and is then discharged to the outside of the housing of the ADF. It is to be noted, as straight path mode is selected, the stacked documents in the cassette 50 must be arranged in a face (image)-down orientation such that the image thereon maybe scanned at the scanning location 40. It is noted also, the page order is reversed as compared to the original page order when straight path mode is selected.

Figure 3:
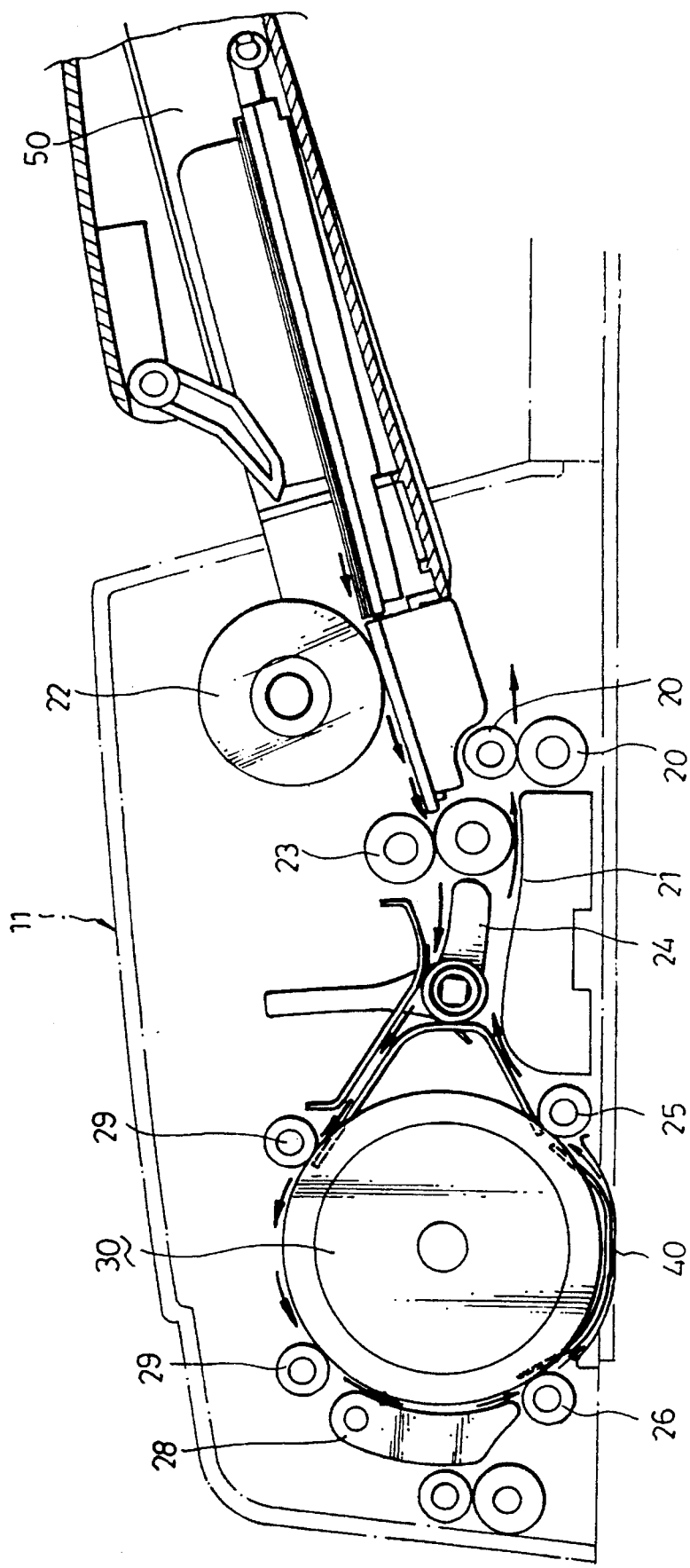
FIG. 3 is the view showing the components of the invention and the operation of U-turn mode.

Referring to FIG. 3, the present invention comprises a second document path which is defined by a pick-up roller 22, the transporting rollers 23, the transporting rollers 29, 30, the selector 28, the transporting rollers 26, 25, the guiding surface 21 and discharge rollers 20. The document is directed through the second document path indicated by the arrow sign as the path selector 24 is set to guide the document transporting from the nip between the rollers 23 upwardly as shown in FIG. 3. The documents are placed and stacked first in the cassette 50 before the scanning operation. As the operation begins, the topmost sheet of documents in the stack is fed into the inner space of ADF through the nip between the pick-up roller 22 and the cooperating guiding surface. Afterwards, the document passes the nip between the transporting rollers 23 and enters into the nip between the rollers 30 and 29 through the guidance of the upper surface of the selector 24. In succession, the document passes the channel between the selector 28 and roller 30, the nip between roller 26 and the roller 30 and enters the scanning position 40 located below the roller 30. After passing the scanning position 40, the document passes the nip between the rollers 30 and 25. Afterwards, the document then passes the nip between the discharge rollers 20 through the guidance of the guiding surface 21 and is discharged to the outside of the housing of the ADF 11. It is to be noted, as U-turn path mode is selected, the stacked documents in the cassette 50 must be arranged in a face (image)-up orientation such that the image thereon may be scanned at the scanning location 40. It is noted also, same page order as that in the document cassette 50 is resulted when U-turn path mode is selected.

Figure 4:
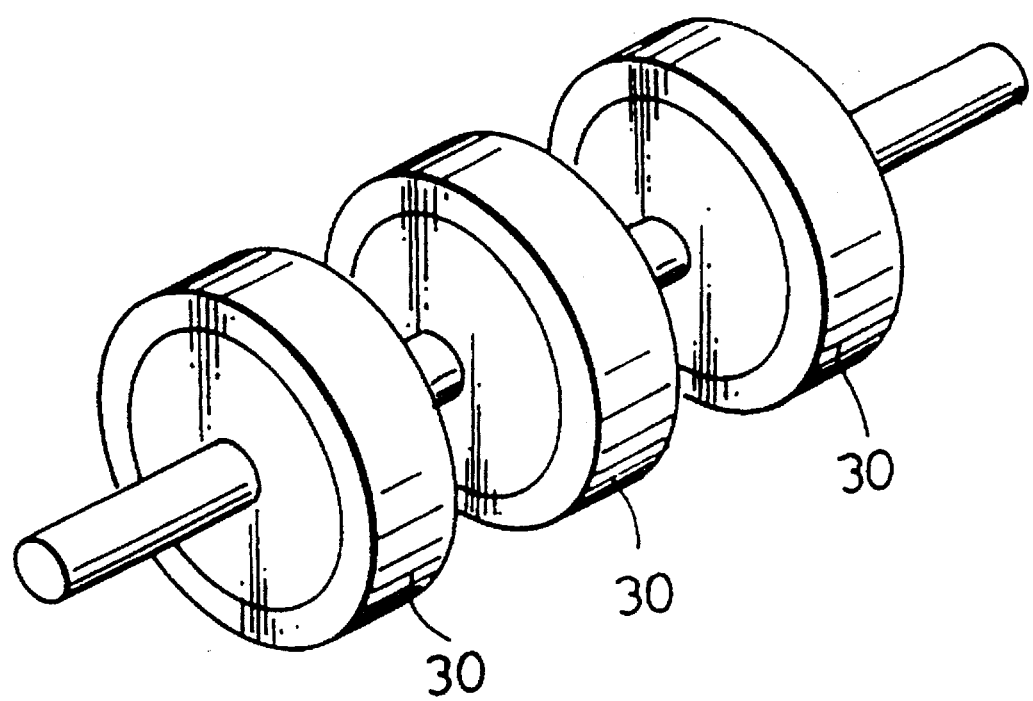
FIG. 4 shows the perspective view of the transporting roller 30 in FIG. 2 or FIG. 3.

FIG. 4 is provided to show the transporting rollers 30 are arranged to space from each other along its rotation axis such that the spaces therebetween accommodate the ends of the selector 28 while operated in straight path mode or accommodate the ends of associated paper guiding plates.

I claim:

1. An automatic document feeder (ADF) used with an image forming apparatus for automatically sequentially feeding a plurality of documents having images thereon from a paper cassette to an illumination position of the image forming apparatus with the topmost document of the plurality of documents fed first, the plurality of documents being placed and stacked in the paper cassette selectively in sequential order and reversed order, said ADF comprising:

a first document path which directs said documents to the illumination position and which discharges said plurality of documents after being illuminated to a first document outlet of the ADF such that the discharged documents are stacked in reversed page order when said plurality of documents are stacked in sequential page order and in an image-down orientation in said paper cassette, the first document path being of a substantially straight path;

a second document path which directs said documents to the illumination position and which discharges said plurality of documents after being illuminated to a second document outlet of ADF such that the discharged documents are stacked in sequential page order when said plurality of documents are stacked in sequential page order and in an image-up orientation in said paper cassette, the second document path being of a substantially U-turn path;

a path selector which selects between said first and second document paths before the documents enter into the illumination position.

\* \* \* \* \*